US005495948A

United States Patent [19]
Ishida et al.

[11] Patent Number: 5,495,948
[45] Date of Patent: Mar. 5, 1996

[54] ASH MELTING FURNACE ARRANGEMENT AND METHOD FOR SUPPLYING ASH TO ASH MELTING FURNACE

[75] Inventors: Michio Ishida, Nara; Tsutomu Kuwahara, Kashihara; Satoshi Kawaguchi, Kawachinagano; Tadashi Kono; Norihiro Aoki, both of Toyonaka; Yoshitoshi Sekiguchi, Maizuru; Kunio Sasaki, Maizuru; Hideo Shimotani, Maizuru, all of Japan

[73] Assignee: Hitachi Zosen Corporation, Osaka, Japan

[21] Appl. No.: 251,716

[22] Filed: May 31, 1994

[30] Foreign Application Priority Data

| Jun. 1, 1993 | [JP] | Japan | 5-129861 |
| Oct. 14, 1993 | [JP] | Japan | 5-256810 |
| Feb. 28, 1994 | [JP] | Japan | 6-029242 |

[51] Int. Cl.⁶ .................. B03B 1/00; B03C 1/30
[52] U.S. Cl. .................. 209/11; 209/38; 209/393; 73/73
[58] Field of Search ............... 209/3, 11, 12.1, 209/38, 40, 393; 73/73

[56] References Cited

U.S. PATENT DOCUMENTS

| 4,518,699 | 5/1985 | Bohl | 73/73 X |
| 4,669,397 | 6/1987 | Galgana et al. | 209/38 X |
| 4,804,147 | 2/1989 | Hooper | 209/38 X |
| 4,938,864 | 7/1990 | Frazier et al. | 209/11 X |
| 5,032,255 | 7/1991 | Jauncey | 209/11 X |
| 5,108,589 | 4/1992 | Sherman | 209/393 |

FOREIGN PATENT DOCUMENTS

| 962691 | 4/1957 | Germany | 209/38 |

OTHER PUBLICATIONS

"Melting Technique for Incinerated Ash and Others; The Status Quo and the Subject" issued by Japan Waste Research Foundation in Apr. 1994 (Extract).

"Melting Technique of Incinerated Residuum; Status quo and Subject" Journal Solid & Liquid Wastes, vol. 23, No. 5, pp. 92–107, published by Kankyo Sangyo Shinbunsha in May 1993.

Primary Examiner—William E. Terrell
Assistant Examiner—Tuan Nguyen
Attorney, Agent, or Firm—Barnes, Kisselle, Raisch, Choate, Whittemore & Hulbert

[57] ABSTRACT

A dry sorting machine having a separating function for removing solids of more than a predetermined size from ash and a drying function for drying the ash, and a magnetic sorting machine for removing metals from the dried ash are arranged in a pretreatment route for the ash to be supplied to the furnace. Further, there is provided a drying air pipe for introducing the high-temperature air heat-recovered from exhaust gases discharged from the ash melting furnace into the dry sorting machine. Thus, by the dry sorting machine having the separating and drying functions, simplification of the ash pretreatment process and reduction of the installation space can be achieved.

2 Claims, 8 Drawing Sheets

ASH MELTING FURNACE ARRANGEMENT AND METHOD FOR SUPPLYING ASH TO ASH MELTING FURNACE

FIELD OF THE INVENTION

The present invention relates to an ash melting arrangement for heating and melting ash discharged from the garbage burning furnace or industrial waste burning furnace, and a method for supplying the ash to the ash melting furnace, with a view to slagging the ash for volume reduction and innocuity.

BACKGROUND OF THE INVENTION

The ash discharged from the garbage burning furnace after being cooled by cooling water contains a large quantity of water together with solids and metals. Therefore, in the pretreating unit for the ash, bulky materials are first removed from the ash, then solids of diameters larger than a predetermined value are separated from the remaining ash and the separated solids are crushed by a crusher for further separation of new solids resulting from such crushing. Further, after the ash removed of the solids is dried and then removed of the metals, the ash is supplied to the ash supply hopper of the ash melting furnace. The ash supply hopper is provided with an ash supply port and an ash pusher at the bottom thereof which moves forward and rearward with respect to the supply port so that the ash in the supply hopper is supplied into the ash melting furnace.

The ash pretreating process according to the prior art technique has had the problem that it is complicated tending to cause troubles and the ash supply hopper sometimes becomes unable to supply the ash due to the occurrence of a bridge phenomenon in the ash and further, the amount of supply of the ash to the melting furnace tends to vary.

The present invention has for its object to provide an ash melting furnace and a method for supplying an ash to the melting furnace which can eliminate the above-described prior part problems. That is, the ash melting furnace and the method according to the present invention makes it possible to simplify the ash pretreating unit, prevent the occurrence of the bridge phenomenon in the ash in the ash supply hopper and supply the ash into the melting furnace in a stabilized state.

DISCLOSURE OF THE INVENTION

In order to solve the above-mentioned problems, the ash melting furnace arrangement according to the present invention includes an ash pretreating unit for pretreating an ash containing a large quantity of water so as to supply it into a melting furnace which is provided with:

- a dry sorting machine arranged in an ash pretreating unit in which an ash containing a large quantity of water is pretreated and supplied to an ash melting furnace and adapted to remove solids of a size larger than a predetermined value and at the same time drying the ash;
- a magnetic sorting machine for removing metals from the dried ash; and
- a drying air pipe for introducing, as drying air, high-temperature air heat-recovered from exhaust gases from the ash melting furnace, into the dry sorting machine.

With the above structure, by the provision of a dry sorting machine having a solid separating function and a drying function integrated with each other, it is possible to simplify the ash pretreating process to eliminate the occurrence of troubles and reduce the installation space for the pretreating unit thereby compacting the entire arrangement.

DESCRIPTION OF THE EMBODIMENT

Prior to describing an embodiment of the present invention, a prior art arrangement will be described with reference to the accompanying drawings.

Figure 9:
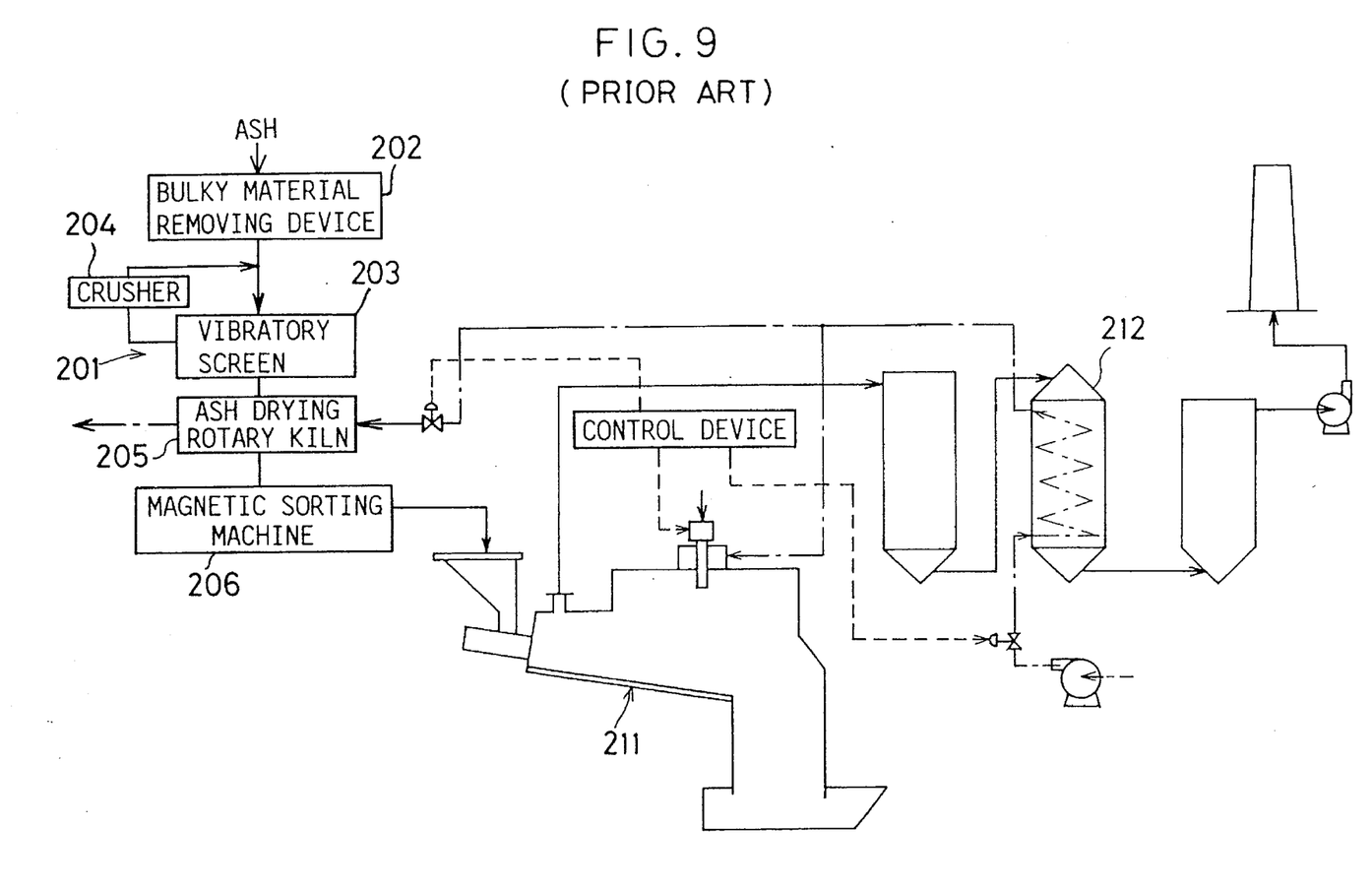
FIG. 9 is a block diagram of a prior art ash melting furnace arrangement in its entirety.

FIG. 9 is a block diagram of a prior art ash melting furnace arrangement. An ash, pretreating unit 201 comprises a bulky material removing device 202 for removing bulky metals or clinkers from an ash, a vibratory screen 203 for screening solids of more than 50 mm in diam. from the ash; a crusher 204 for crushing the screened solids to supply them to the vibratory screen again; an ash drying rotary kiln 205 into which the ash screened to less than 50 mm in diam. by the vibratory screen 203 are supplied and in which the ash is dried by an air heater (heat exchanger) 212 in an exhaust gas treating route G of an ash melting furnace 211 and a magnetic sorting machine 206 for removing metals from the dried ash.

Accordingly, the above-mentioned ash pretreating unit 201 has had the problems that it has complicated ash pretreating steps (bulky material removing, vibratory separation, crushing, drying, metal removing) and since the equipment for performing the steps becomes; complicated, troubles tend to take place and the installation space for the pretreating unit becomes large.

One embodiment of the ash melting furnace arrangement according to the present invention will now be described with reference to FIGS. 1 through 8.

Figure 1:
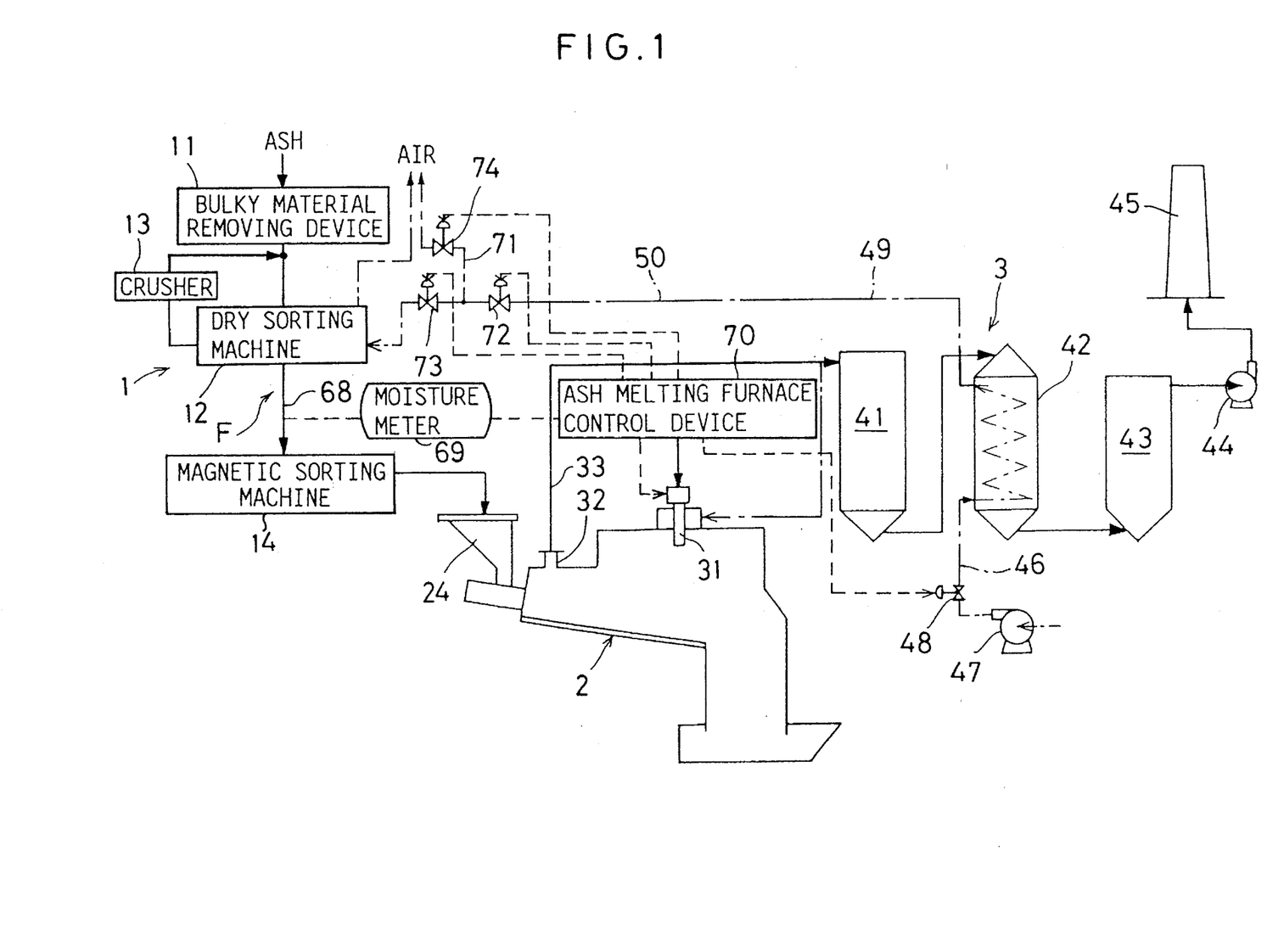
FIG. 1 is a block diagram of an ash melting furnace according to one embodiment of the present invention.

As shown in FIG. 1, An ash burned by the ash burning furnace is discharged from the furnace after it is cooled with cooling water so that it contains a large quantity of water in addition to solids and metals. Therefore, the ash melting furnace arrangement is provided with a pretreating unit 1, an ash melting furnace 2 for generating slag by heating and melting ashes and an exhaust gas treating unit 3 for treating exhaust gases from the ash melting furnace 2.

That is, the ash pretreating unit 1 for pretreating the ash discharged from an ash burning furnace (not shown) comprises a bulky material removing device 11, a dry sorting machine 12 which removes from the ash solids of larger than 50 mm in diam., a dry sorting machine 12 which receives drying air from an air heater (heat exchanger) 42 mounted in the exhaust gas treating unit 3, through a drying air inlet can solve the above-mentioned problem pipe 50 and which reduces the water content of the ash to about 10 wt %–20 wt %, a crusher 13 which crushes the solids screened by the dry sorting machine 12 and supplies them to the dry sorting machine again and a magnetic sorting machine 14 for removing the metals screened and dried by the dry sorting machine 12 all of which machines and devices are arranged along a pretreatment route F for the ash.

Figure 2:
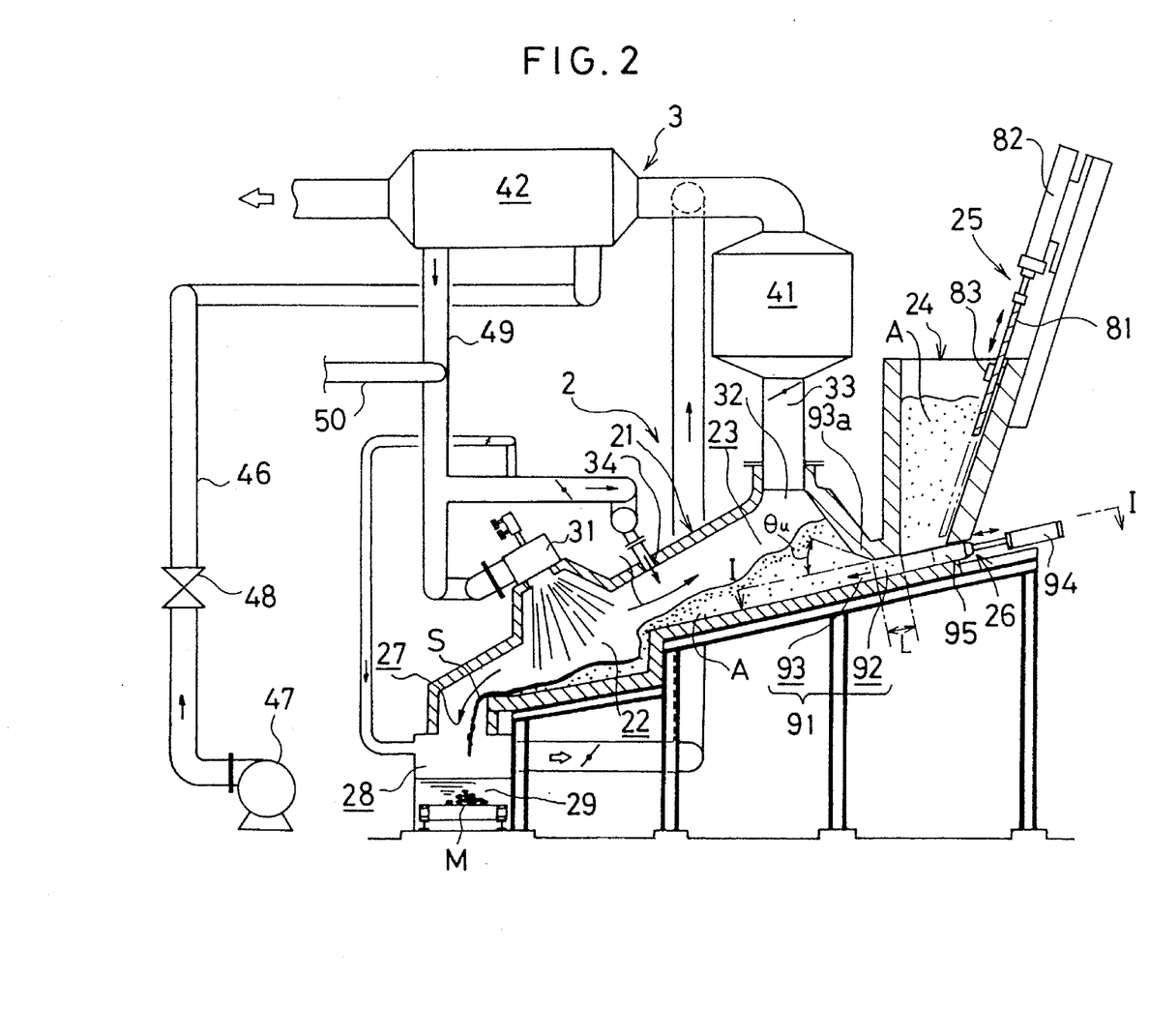
FIG. 2 is a vertical sectional view of the central portion of an ash melting furnace of the ash melting furnace arrangement of FIG. 1.

As shown in FIG. 2, the above-mentioned ash melting furnace 2 is in the form of a combustion gas counter-flow type burner and provided with a melting chamber 22 formed on the downstream side of a furnace body 21, a preheating chamber 23 formed on the upstream side of the body 21, an ash supply hopper 24 arranged on the upstream side of the preheating chamber 23, a bridge removing device 25 disposed in the ash supply hopper 24 so as to destroy bridges formed in the ash A in the hopper, an ash pusher 26 arranged at the bottom of the ash supply hopper 24 and adapted to supply the ash A by a predetermined amount to the preheating chamber 23 in a stabilized manner, a slag cooling chamber 28 arranged at the downstream end of the furnace body 21 to communicate with a slag takeout port 27 and a cooling water tank 29 arranged below the slag cooling chamber 28 so as to cool a molten slag S to produce a water-cooled slag M. Further, the bottom walls of the melting chamber 22 and the preheating chamber 23 incline downward from the upstream end toward the slag takeout port 27 on the downstream side and further, a melting burner 31 is arranged on the ceiling wall of the melting chamber 22 and the ceiling wall of the preheating chamber 23 is attached with an exhaust gas port 32 to which an exhaust gas pipe 33 is connected. Reference numeral 34 designates an additional air nozzle arranged on the ceiling wall between the melting chamber 22 and the preheating chamber 23.

Further, the exhaust gas pretreating unit 3 includes, as shown in FIG. 1, an exhaust gas cooler 41 for cooling the exhaust gases of about 1100 C. from the ash melting furnace 2 to about 500 C., the above-mentioned air heater 42 for obtaining high-temperature air of 350 C. by exchanging heat with exhaust gas of about 500 C., a bag filter 43 for collecting dust contained i the exhaust gases of lower than 200 C discharged from the air heater 42, an induced draft fan 44 and a duct 45 all of which are arranged along an exhaust gas discharge route G. To a a air intake pipe 46 connected to the air heater 42 there is connected a blowout port of a forced draft fan 47 through a first adjusting valve 48. Further, a combustion air intake pipe 46 connected to the melting burner 31 from the outlet of the air heater 42 is branched midway to be connected to a drying air pipe 50 and the drying air pipe 50 is connected to the dry sorting machine 12.

Next, the dry sorting machine 12, bridge removing device 25 and ash pusher 26 will be described in detail in that order.

Figure 3:
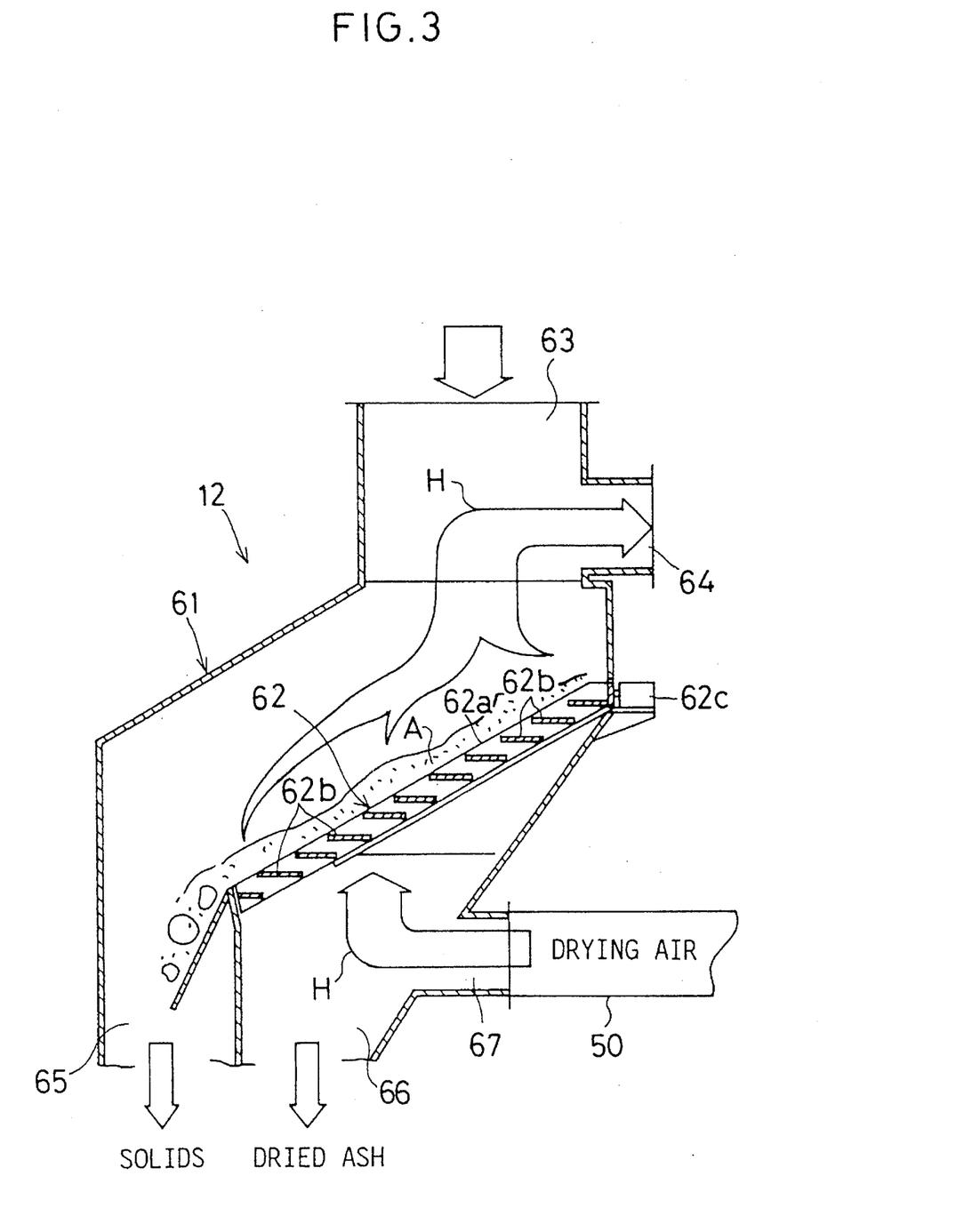
FIG. 3 is a vertical sectional view of a dry sorting machine of the ash melting furnace arrangement of FIG. 1.
Figure 4:
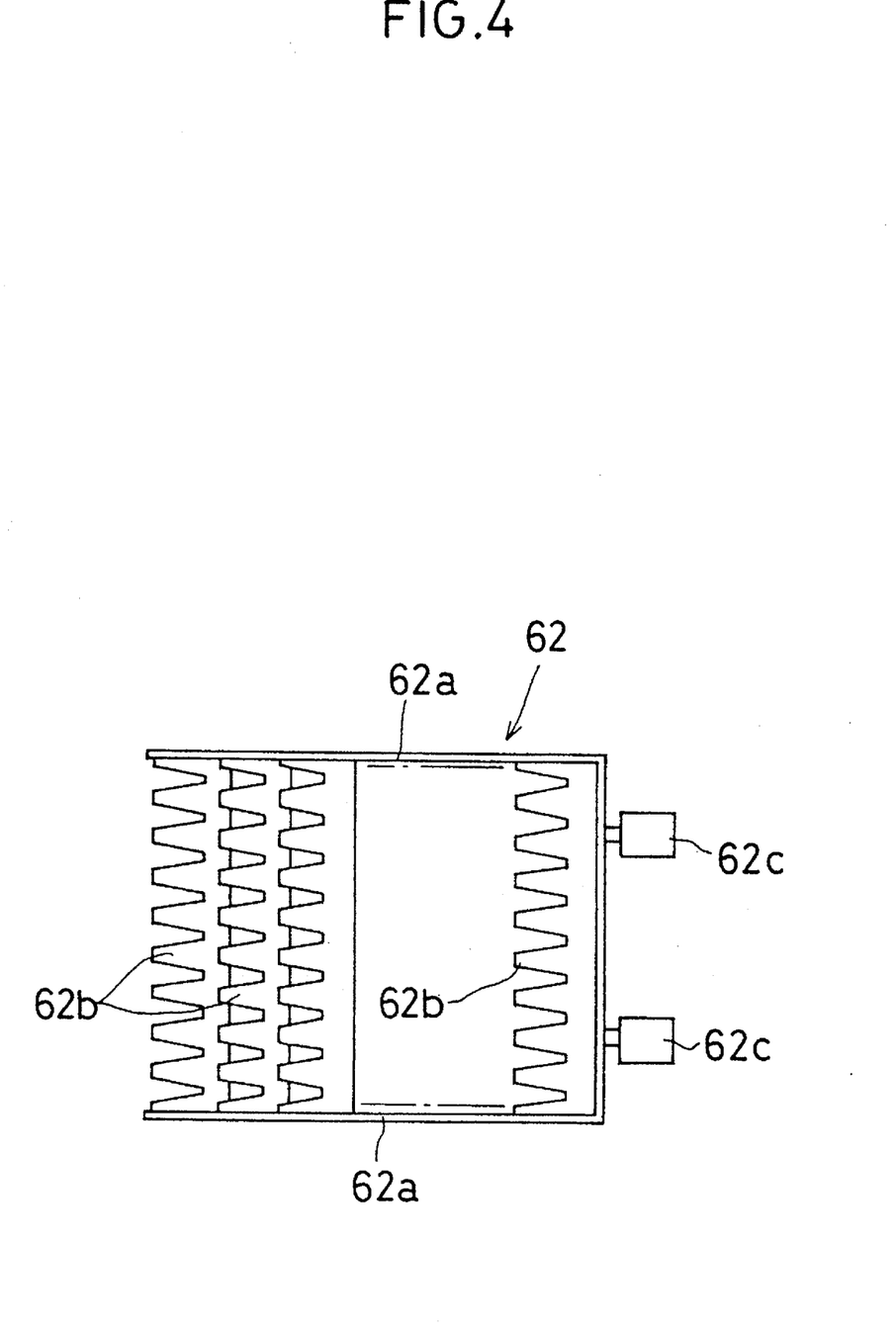
FIG. 4 is a plan view of a screen of the dry sorting machine of FIG. 3.

As shown in FIG. 3, the dry sorting machine 12 comprises a screen 62 arranged within a casing 61 with its one end inclined from one end toward the other end of the casing, an ash supply port 63 formed upwardly at one end of the casing 61 and through which an ash is supplied, a drying air exhaust port 64, a solids discharge port 66 formed below the screen 62 and a drying air supply port 67 connected to the drying air pipe 50. As shown in FIG. 4, the screen 62 is constructed such that a plurality of comblike blade plates 62b are arranged in a plurality of stages between two vibratory frames 62a in spaced-apart relationships with one another and vibrators 62c whose output shafts are respectively connected to vibratory frames 62a are connected to one end of the casing 61.

As shown in FIG. 1, an infrared moisture meter 69 for detecting the water content of ash A is attached to an ash supply pipe 68 leading from the dry sorting machine 12 to the magnetic sorting machine and the value of detection is inputted to a melting furnace control device 70. Further, an adjusting exhaust pipe 71 whose top end opens in the atmosphere is connected to the drying air pipe 50 and a first drying air adjusting valve 72 is connected to the air pipe 50 on the upstream side of the junction of the pipes 50 and 71 while a second drying air adjusting valve is connected to the pipe 50 on the downstream side of that junction. In addition, a third drying air adjusting valve 74 is connected to the adjusting exhaust pipe 71 and the first to third drying air adjusting valves 72–74 are so controlled by the melting furnace control device 70 that the water content of the ash A becomes about 10–20 wt %. In this case, when the water content of the ash A is less than 10 wt %, the ash A tends to scatter more when it is supplied into the the ash melting furnace 2 and the amount of the ash A discharged by following the exhaust gases increases. Further, if the water content of the ash A exceeds 20 wt %, the portion of the ash previously supplied into the ash melting furnace 2 is heated by the melting burner 31 to become a mass whose surface only is consolidated so that the subsequently soft ash A pushed into the furnace 2 by the pusher 26 can not move the superficially solidified mass of ash downward resulting in that the supply of the ash A into the melting furnace A becomes difficult and the thermal energy required for melting the ash A increases.

Figure 5:
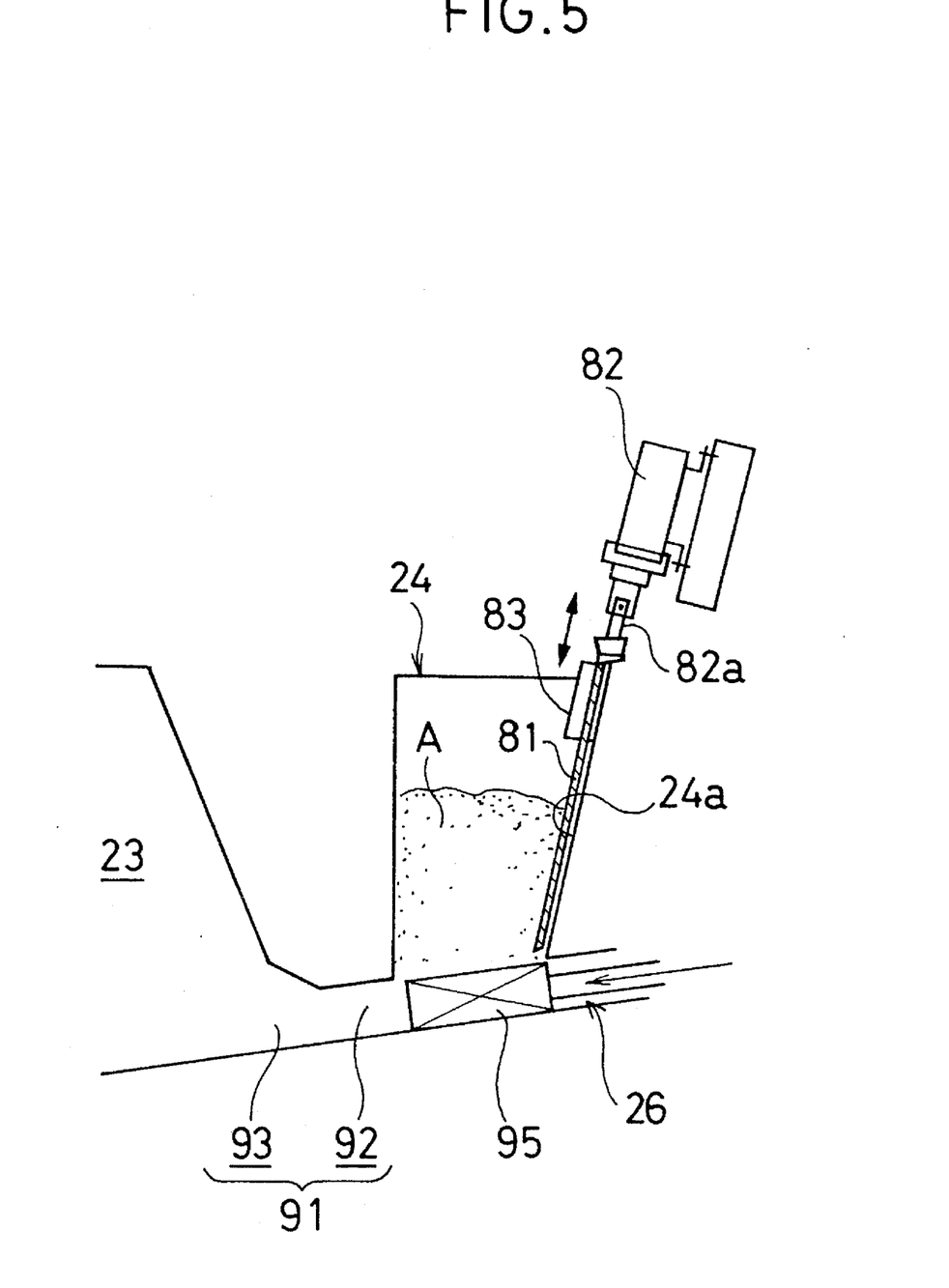
FIG. 5 is a vertical sectional view of a bridge removing device of the ash melting furnace.

The bridge removing, device 25 is, as shown in FIG. 5, provided with a slide member movable vertically along the inner surface of the ash supply hopper 24 and a drive mechanism for driving the slide member.

That is, a slide plate 81 (as the slide member) slidable vertically by a guide 83 is arranged on an inner wall surface 24a of the ash supply hopper 24 with an angle of inclination of, for example, 80°. This slide plate 81 is coupled to a piston rod 82a of an air cylinder (drive mechanism) 82 arranged above the ash supply hopper 24. Accordingly, when the air cylinder 82 driven to move forward and rearward, the slide plate 81 is guided by the guide 83 to move vertically along the inner wall surface 24a of the ash supply hopper 24 so that the ash A adhered to the slide plate 81 is moved to cause cracks to take place in the compressed layer of the ash A to thereby prevent the generation of a bridge phenomenon in the ash A.

Figure 6:
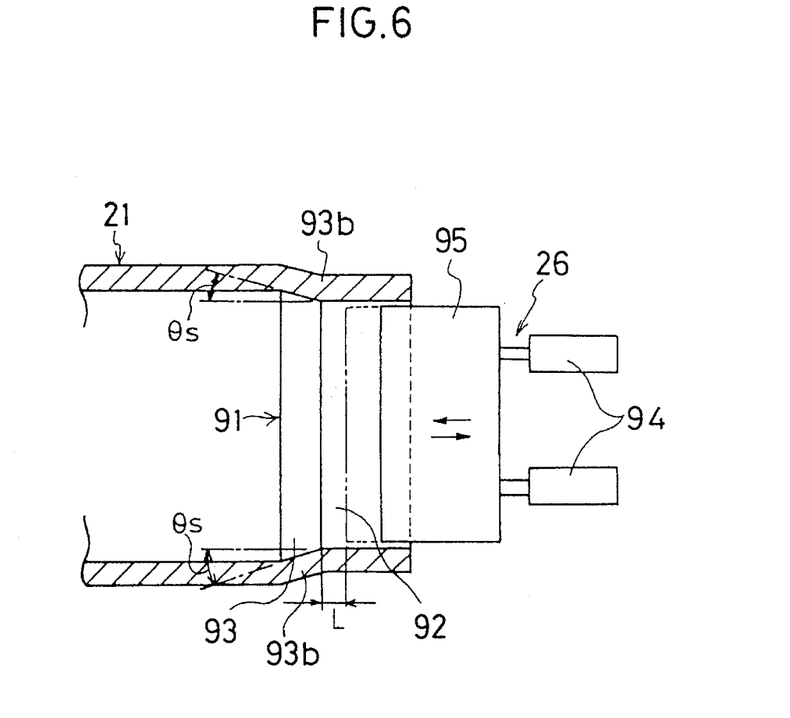
FIG. 6 is a sectional view taken along the I—I line of FIG. 2.

As shown in FIGS. 2 and 6, the ash pusher 26 comprises an ash supply port 91 having an inlet side consolidation passage 92 and an outlet side enlarged passage 93 and a push body 95 movable forward and rearward with respect to the ash supply port 91 by means of a push cylinder (forward and rearward device) 94. The passage 92 extends straight from the projecting end of the push body 95 with its length in the range of between 100 mm–200 mm and has a rectangular section identical to, or slightly larger than, the front shape of the push body 95. Further, the enlarged passage 93 is formed to become continuous with the preheating chamber 23 such that a ceiling wall 93a of the passage 93 widens upward by an angle of $\theta u = 5°–30°$ from the outlet of the consolidation passage 92 and both side walls 93b widen sidewardly by an angle of θs=5°–30°. Accordingly, when the push body 95 is caused to project toward the ash suitably port 91 by the action of the push cylinder 94, the ash A in the ash supply hopper 24 is pressed to become consolidated in the consolidation passage 92 of the ash supply port 91 due to the resistance of the ash A in the preheating chamber 23 and the ash feeding frictional resistance and is supplied into the preheating chamber 23 from the enlarged passage 93.

The reason why the length L of the consolidation passage 92 has been set to the range of between 100 mm and 200 mm is that when the length L is less than 100 mm, the ash A is fed into the preheating chamber 23 without being consolidated so that the amount of supply becomes unstable while when the length L exceeds 200 mm, the compressibility of the ash A becomes large and easily solidified which may results in blocking the ash supply port 91. Further, the reason why the enlarged passage 94 has been tapered to widen toward the end is that by so doing, the consolidated ash A may be fed smoothly. It is noted theft in the instant embodiment, the consolidation passage 92 is formed straight but it may be tapered to become narrower toward the end and shortened in length.

Next, the operation of the ash melting furnace arrangement of the above-described structure will be described.

The ash A containing a large quantity of water and discharged from the garbage burning furnace is first supplied to the bulky waste removing device 11 of the ash pretreating unit 1 and after being removed of big metals and bulky clinkers, it is supplied to the dry sorting machine 12 where the vibrators 62c are driven to oscillate the comblike blade plates 62b so that the ash A thrown into the ash supply port 63 is separated through the comblike blade plates 62 to fall down while the separated ash A is dried by being brought into direct contact with the high-temperature drying air H introduced into the casing 61 through the drying air supply port 67. Further, bulky solids unable to fall down from among the comblike blade plates 62b slide down on the comblike blade plates 62b in sequence to be discharged into the solid discharge port 65 and after being supplied to the crusher 13 by transfer means (not shown) for crushing, supplied again to the dry sorting machine 12.

In this case, the water content of the ash A passing through the ash supply pipe 68 from the ash exhaust port 66 is detected by the moisture meter 69 and the first to third drying air adjusting valves 72 through 74 are so controlled as to become about 10 wt % to 20 wt % by the ash melting furnace control device 70 on the basis of the detected value by the moisture meter 69 and the amount of drying air introduced into the dry sorting machine 21 is controlled. Consequently, the ash A can be suitably dried and supplied continuously in correspondence to the variation of the supply amount or water content of the ash A. Thus, the ash A discharged from the dry sorting machine 12 is removed of metals and then supplied to the ash supply hopper 24 of the ash melting furnace 2.

In the ash supply hopper 24, the air cylinder 82 of the bridge removing device 25 is operated at predetermined intervals to allow the slide plate 81 to move vertically every predetermined period of time so that the compressed layer of the ash A heaped within the ash supply hopper 24 cracks to destroy the layer due to its own weight. Accordingly, the generation of a bridge phenomenon is prevented and the ash A is supplied smoothly.

Further, where the ash A is supplied to the preheating chamber 23 from the ash supply hopper 24 through the ash supply port 91, the ash is pushed out into the consolidation passage 92 of the ash supply port 91 due to projecting motion of the push body 95 driven by the push cylinder 94 of the ash pusher 26 and pressed by the resistance of the ash A in the preheating chamber 23 and frictional resistance so that the ash A is consolidated to a substantially constant density and is supplied smoothly into the preheating chamber 23 from the enlarged passage 93.

According to the instant embodiment, the dry sorting machine 21 having both solid separating and drying functions integral with each other is arranged in the ash pretreating unit 1 and therefore, when compared to the prior art arrangement in which the vibratory screen 203 having a solid separating function and the rotary kiln 205 having a drying function (both of which devices are required to be large-sized for ash treatment) are separately arranged, it is possible with the present invention to sharply reduce the space to be occupied by the ash pretreating unit 1 and to simplify the ash pretreating route F thereby reducing the trouble resulting from the complicated pretreating process. Further, the dry sorting machine 21 has both the solid separating and drying functions, it is possible to prevent the ash A from adhering to the solid separating member such as the the screen 23.

Further, in contrast to the prior art ash supply hopper having no bridge removing device 25 in which the bridge phenomenon generates every two to four hours, the present invention allows the ash to be supplied continuously for more than 24 hours since the generation of the bridge phenomenon can be prevented by the bridge removing device 25. Moreover, although in the present invention the ash A is described to have been dried to have a water content of about 10 wt % to 20 wt %, it was actually possible to prevent the generation of the bridge phenomenon even when the water content of the ash A was in the order of between 20 wt % and 35 wt %.

In the instant embodiment, the air cylinder 82 is used as a drive mechanism for the bridge removing device 25 but a hydraulic cylinder or electrical motor may also be used and further, two or more slide plates may be provided on the inner wall surface 24a of the ash supply hopper 24.

Further, the ash pusher 28 can consolidate the ash A to a uniform density by substantially a uniform pressure without being influenced so much by the heaping amount of the ash A in the ash supply hopper 24 or in the preheating chamber 23 so that a constant amount of the ash A can always be supplied into the furnace. Further, the ash A consolidated within the consolidation passage 92 displays a sealing function to prevent the entry and outflow of the open air or combustion gases between the interior of the preheating chamber 23 and the ash supply hopper 24 so that the temperature drop in the furnace body 21 is prevented and the melting of the ash can be effectively performed. In addition, due to the consolidation and solidification of the ash A, the feeding of the ash A in the preheating chamber 23 or the melting chamber 24 can be performed smoothly and the amount of scattering of the ash A in the furnace body 21 is reduced thereby sharply reducing the amount of scattering ash following the combustion gases.

Figure 7:
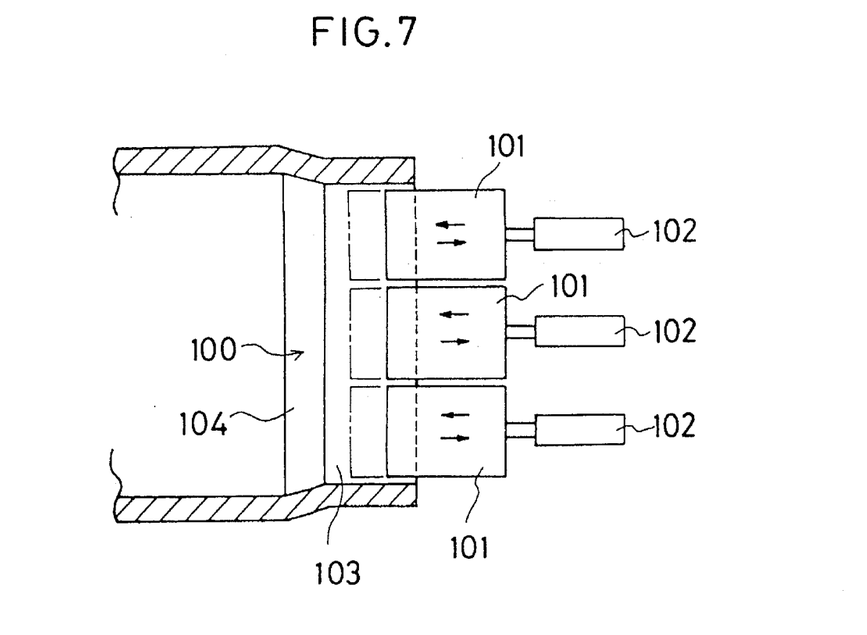
FIG. 7 is a plan sectional view of a pusher of the ash melting furnace.

FIG. 7 shows another embodiment of an ash pusher suitable for a large-sized ash melting furnace. The ash pusher 100 is provided with a plurality of push bodies 101 and the same number of push cylinders 102 for moving the push bodies forward and rearward separately so that even when the adjoining push bodies 101 are separately moved forward and rearward, the ash is consolidated to a substantially constant density by the consolidation passage 103 and fed smoothly to the preheating chamber 23 through the enlarged passage 104.

Figure 8:
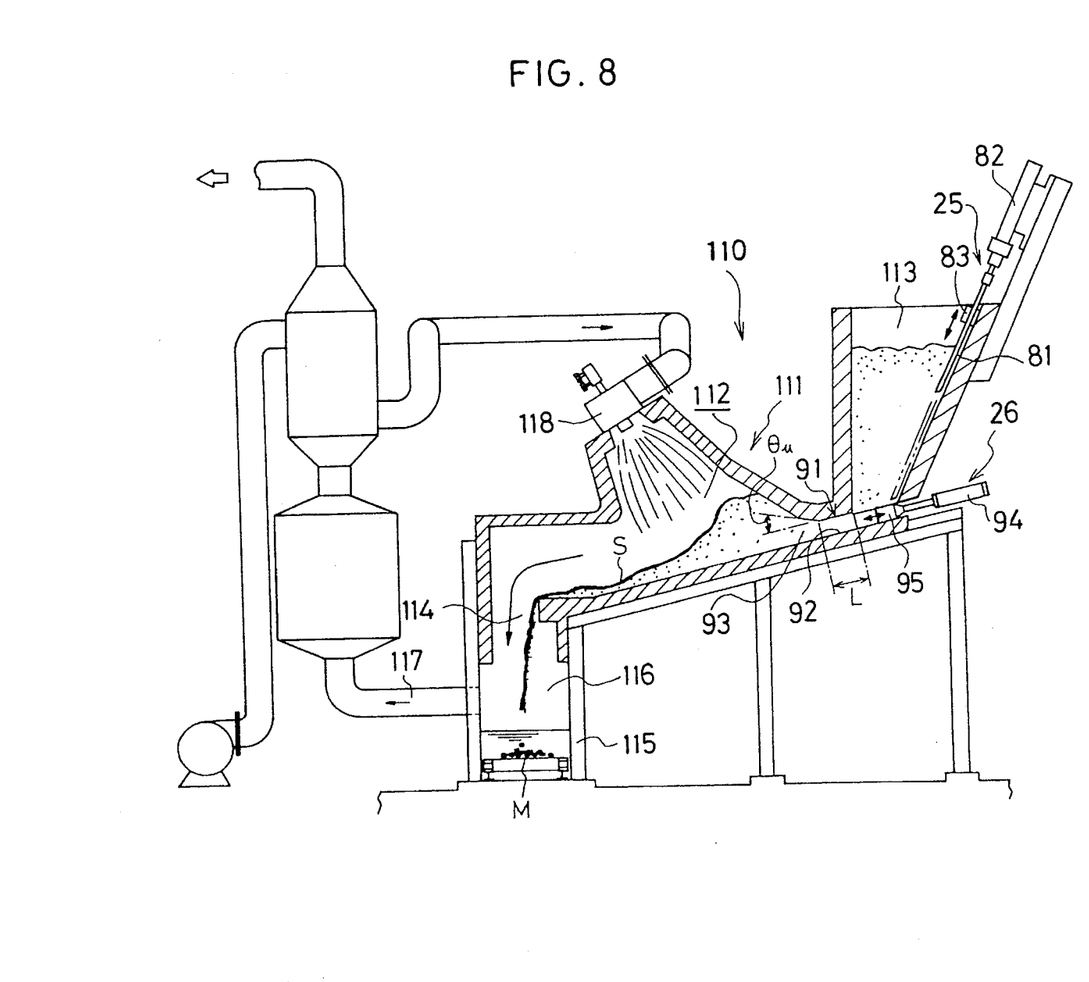
FIG. 8 is a central vertical sectional view of an ash melting furnace arrangement according to another embodiment of the present invention.

FIG. 8 shows a combustion gas counter-flow burner type ash melting furnace 110 provided with a bridge removing device 25 and an ash pusher 26 of the above-described structure. That is, the ash melting furnace 110 is provided with a melting chamber 112 formed at the center of a furnace body 111, an ash supply hopper 113 arranged on the upstream side of the melting chamber 112, the ash pusher 26 for feeding the ash to the melting chamber 112 by a predetermined amount by means of a push body 95 capable of moving forward and rearward with respect to an ash supply port 91 formed at the bottom of the ash supply hopper 113 and a slag cooling chamber 116 having a cooling water tank 115 communicating with the melting chamber 112 on the downstream side of the melting chamber 112 through a slag takeout port 114. Further, the bottom wall of the melting chamber 112 inclines downward from the upstream side thereof at which the ash supply hopper 113 is present to the downstream side thereon at which the slag takeout port 115 is present and an exhaust gas pipe 117 is connected to the slag cooling chamber 116. Further, on the ceiling wall of the melting chamber 112 there is arranged a melting burner 118. This embodiment can also achieve the same effect as the previous embodiment.

What is claimed is:

1. An ash melting furnace arrangement including an ash pretreating unit for pretreating ash which contains a large quantity of water and for supplying the ash to an ash melting furnace, said pretreating unit comprising a dry sorting machine for removing solids of a size larger than a predetermined value from the ash and for drying the ash, a magnetic sorting machine for removing metals from the ash dried by the dry sorting machine, and a drying air pipe for introducing high-temperature air heat-recovered from exhaust gases discharged from the ash melting furnace to the dry sorting machine as drying air, wherein said dry sorting machine comprises:

a casing having a first end and a second end, a screen having a vibratory frame arranged within the casing to slant from the first end of the casing downwardly toward the second end thereof, a plurality of spaced apart comblike blade plates attached to the vibratory frame in a descending series of cascades, and a vibrator connected to the vibratory frame;

an ash supply port disposed above the first end of the casing for supplying ash therethrough;

a solids discharge port disposed below the second end of the casing;

an ash exhaust port disposed below the screen; and a drying air supply port connected to the drying air pipe and disposed below the screen.

2. An ash melting furnace arrangement according to claim 1, wherein the ash pretreating unit comprises a moisture meter for detecting the water content of the ash discharged from said dry sorting machine, and a control device for operating a drying air adjusting valve interposed in the drying air pipe on the basis of a value detected by the moisture meter.

* * * * *